United States Patent [19]
Murphy

[11] 3,708,893
[45] Jan. 9, 1973

[54] EDUCATIONAL GAME

[76] Inventor: John Murphy, 4591 Round Top Drive, Los Angeles, Calif. 90065

[22] Filed: Nov. 12, 1971

[21] Appl. No.: 198,262

[52] U.S. Cl. ................................................35/9 D
[51] Int. Cl. ...............................................G09b 7/00
[58] Field of Search .....................35/9 D, 9 R, 35 D

[56] References Cited

UNITED STATES PATENTS

| | | | |
|---|---|---|---|
| 3,059,346 | 10/1962 | Swimmer et al. | 35/9 R |
| 3,252,230 | 5/1966 | Donev | 35/9 D |
| 3,659,356 | 5/1972 | Nelson | 35/9 D |

Primary Examiner—Wm. H. Grieb
Attorney—Flam & Flam

[57] ABSTRACT

An educational game includes a housing having slots for insertion of coded cards and having a receptacle for a master coded key card. When a correctly sequenced subset of cards all coded like the master code are inserted, a circuit conditioned by the key card releases a shuttered window on the housing to expose a picture formed by the cards.

On each card, the position of a hole indicates the value of each coding parameter. The location of another hole indicates the card's sequence in the coded subset. The housing contains a set of electrical contact bars displaced laterally by the key card to set the contacts into positions indicative of the master coding. Only if the inserted cards match the master codes, in the correct sequence, will the holes be aligned with the contacts so as to complete an electrical circuit opening the shutter.

21 Claims, 13 Drawing Figures

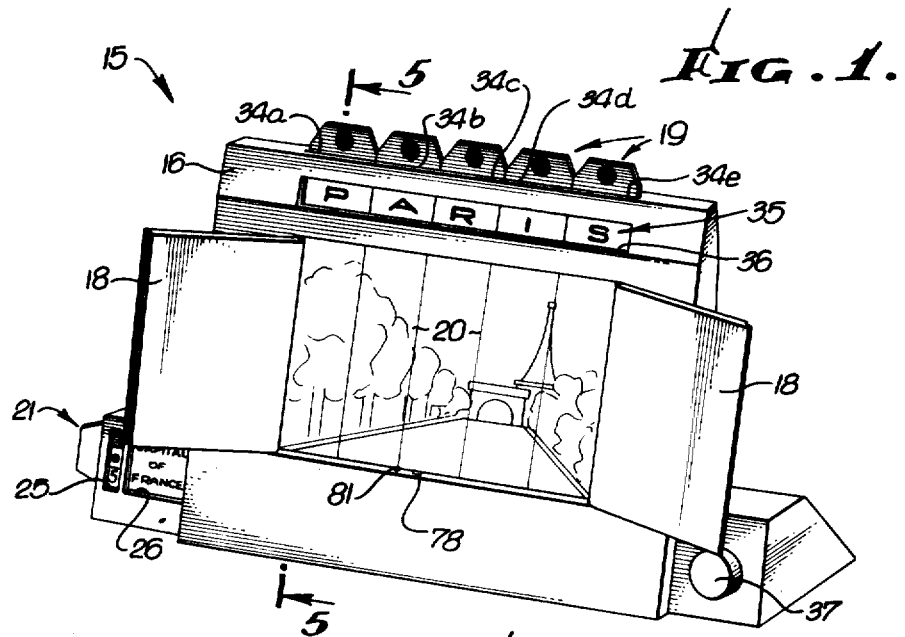
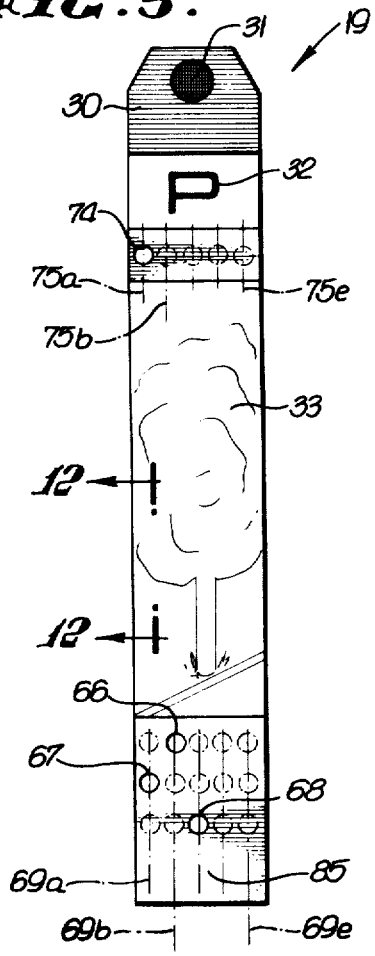
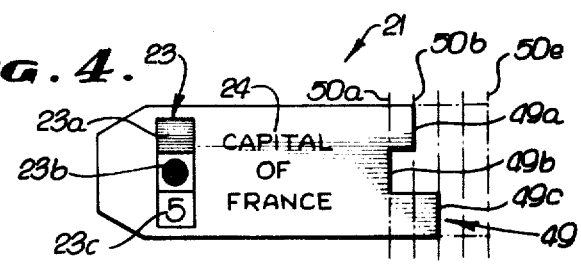

PATENTED JAN 9 1973
3,708,893
SHEET 2 OF 4
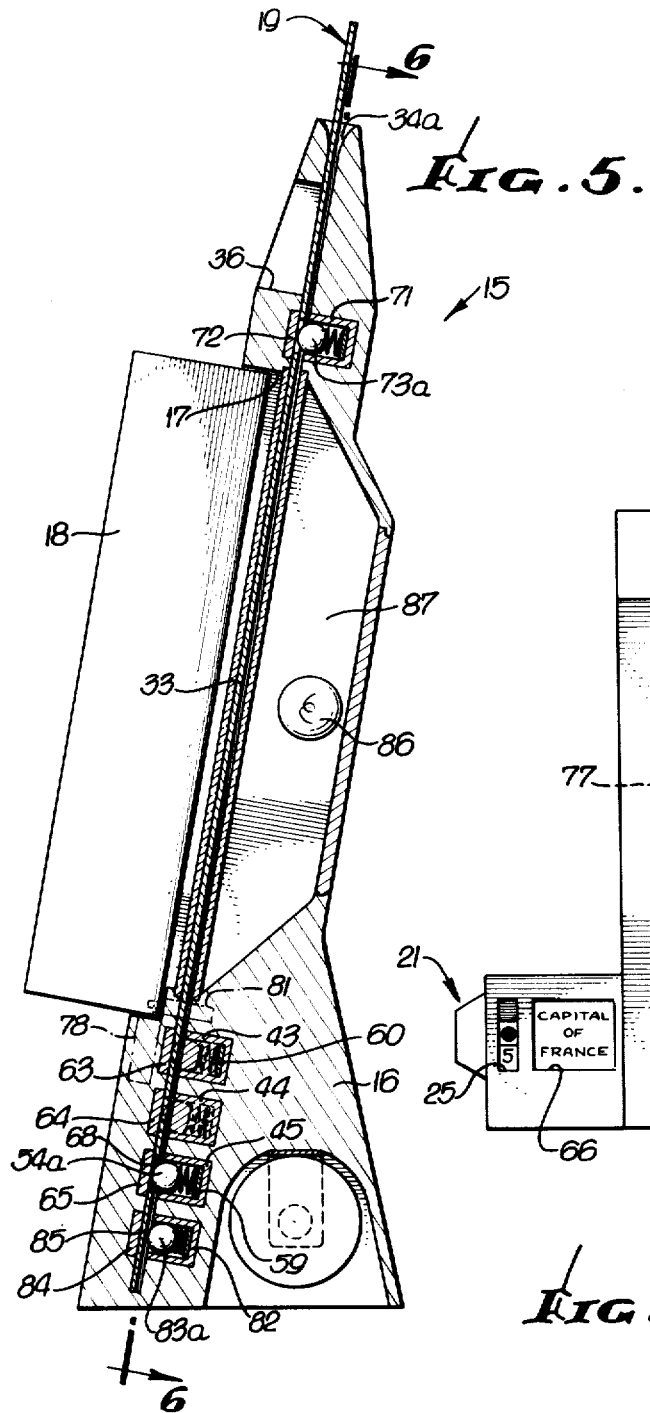
Fig. 5.
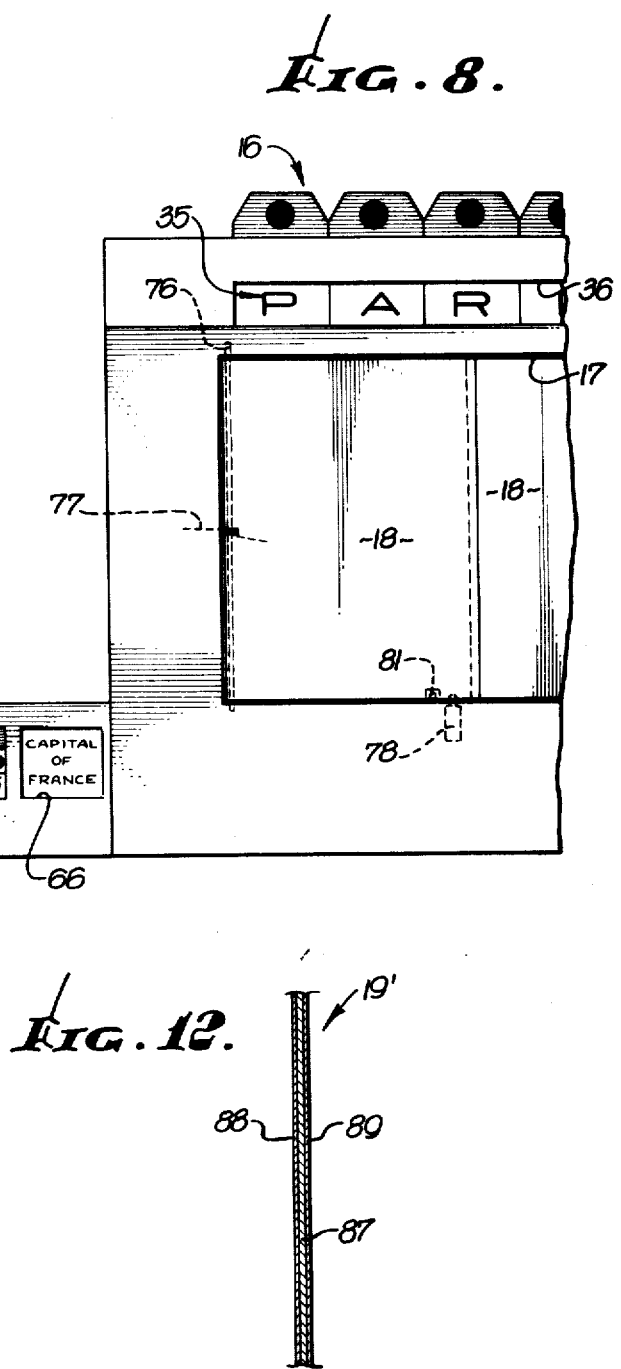
Fig. 8.
Fig. 12.

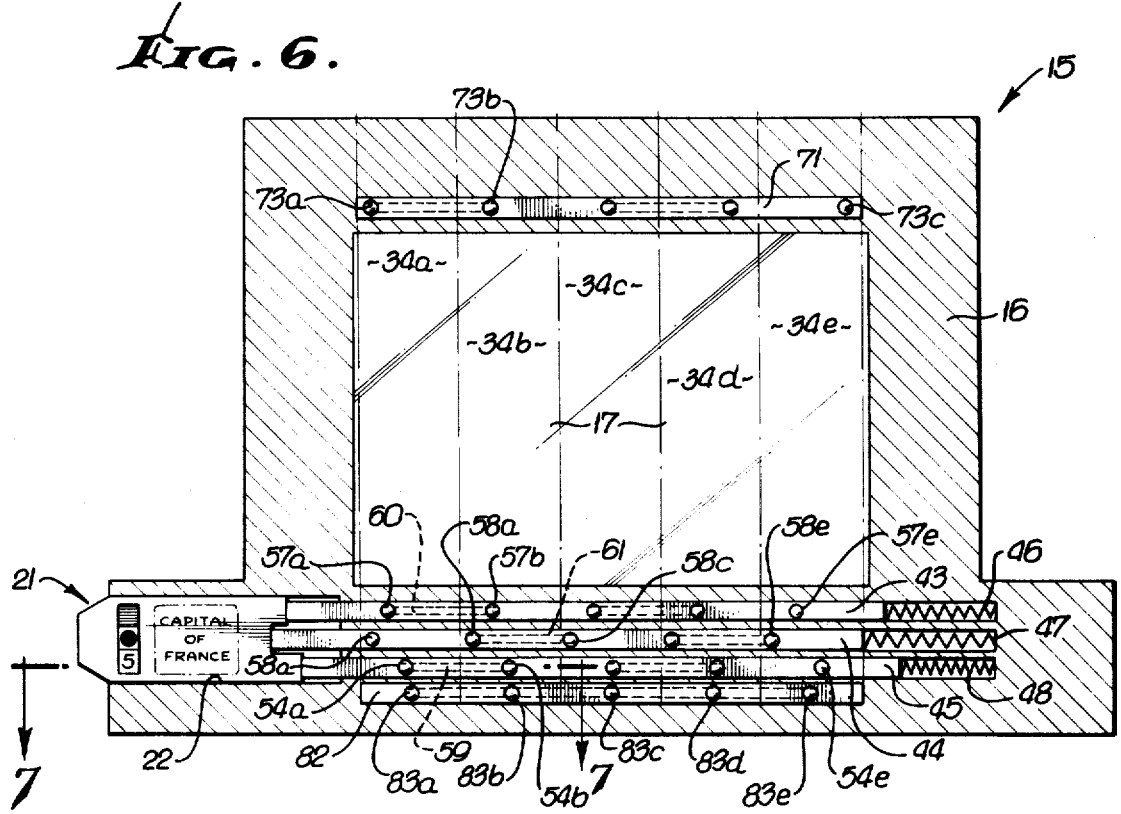
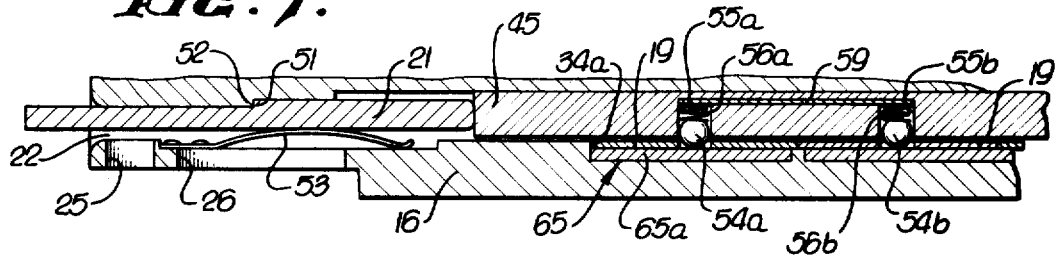
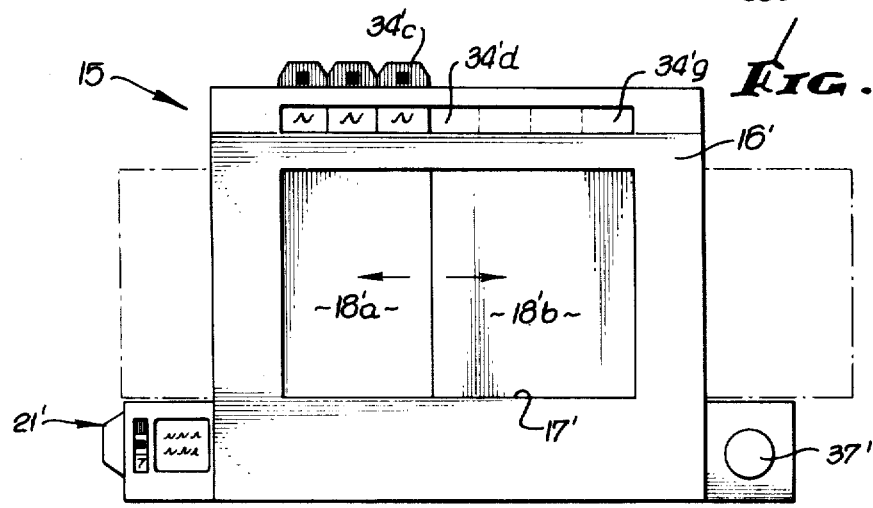

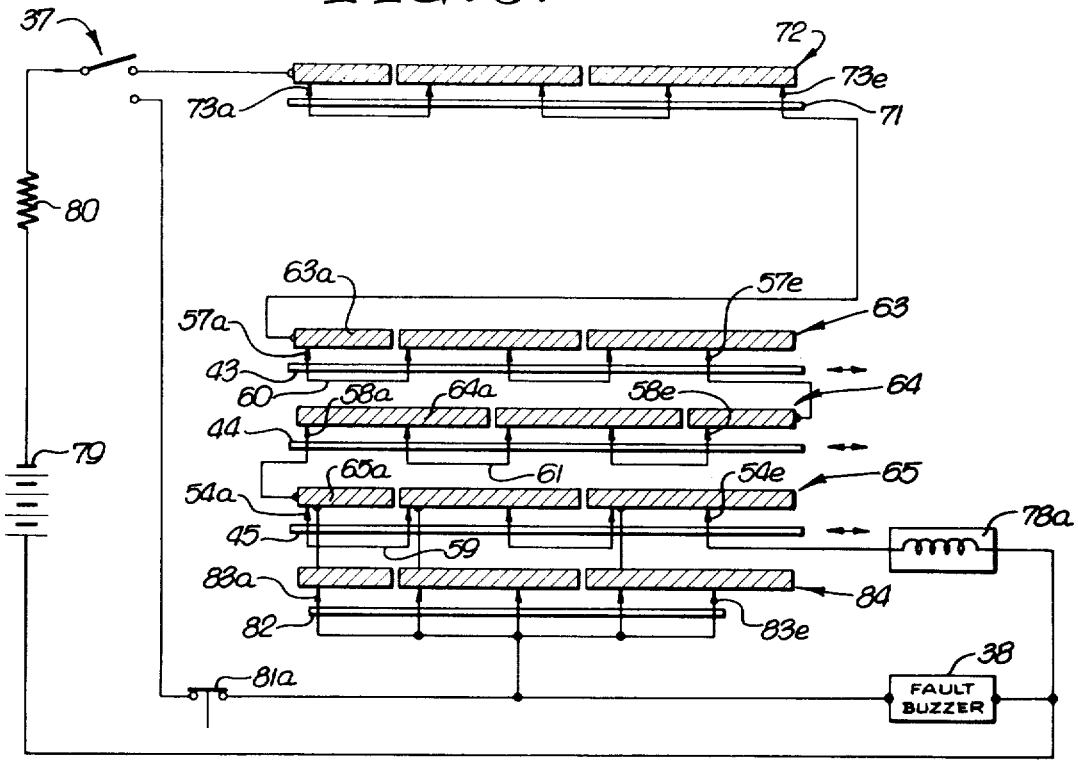
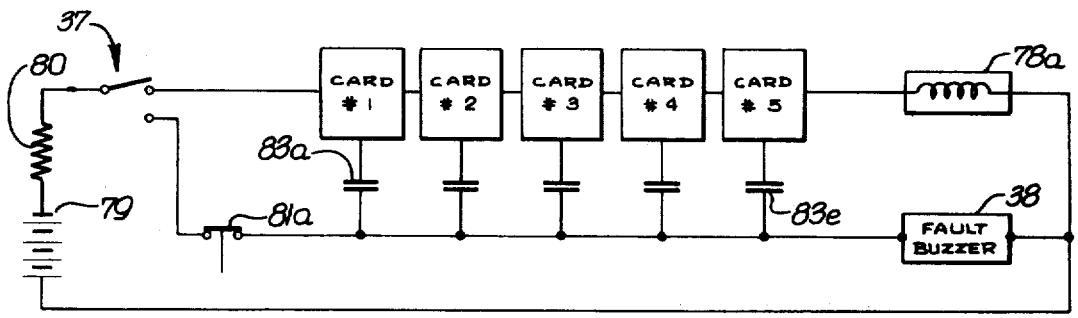
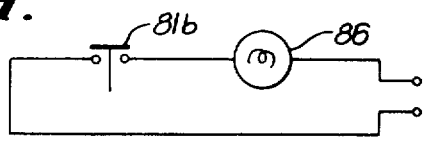

3,708,893

EDUCATIONAL GAME

BACKGROUND OF THE INVENTION

1. Field of the Invention

The present invention relates to an educational game wherein a master coded key card conditions a shuttered window to be opened when a correctly sequenced, like coded subset of cards is inserted into a housing to form a picture behind the window.

2. Description of the Prior Art.

Various teaching games are known wherein card strips have printed thereon a letter and a segment of a picture. When the strips are correctly associated to spell a word, a picture illustrating the word results. Such games promote correct spelling but permit assembly of the word by aligning the picture segments in jigsaw puzzle fashion. The teaching effectiveness and interest of such a game is improved by obscuring the picture segments until the word has been spelled correctly, and one object of the present invention is to provide such a game. The picture is exposed only if the card strips have been assembled in correct sequence; a fault buzzer indicates incorrect arrangement of the cards and hence improper spelling.

Color perception and recognition of geometric shapes are encouraged by encoding the picture-forming cards with these parameters. The user must select cards having both color and shape corresponding to that of a master code. Another object of the invention is to take advantage of such coding in the implementation of a simple shutter release mechanism which is operable with a large set of word- or picture-forming cards.

The utilization of such picture-forming cards in a fact teaching, question and answer type game is another object of the invention. A key card includes a question the answer to which is specified by correct sequential arrangement of the subset of cards having the same code as a master code on the key card.

SUMMARY OF THE INVENTION

The foregoing objects of the invention are achieved by an educational game including a housing having slots for insertion of cards coded, e.g., by color and geometric shape. When a correctly sequenced subset of cards having the same code as that specified by a key are inserted into the housing, a circuit conditioned by the key card actuates a solenoid to release a shuttered window. The picture or design formed by the cards illustrates the word spelled by the cards or the answer to a question printed on the master card.

In a preferred embodiment, each card includes a set of holes the positions of which define the parameter coding of the card. Within the housing a set of electrical contact bars are laterally displaced by insertion of the key card, the extent of displacement being dictated by the coded shape of a key card edge. Only when correctly coded cards are inserted will contacts on the displaced bars project through the card code holes to complete a circuit releasing the window shutter.

The shutter release circuit also includes a sequence detecting contact for each card receiving slot in the housing. A sequence indicating hole on each card will register with such contact only when the card is inserted in the correct sequential position. Thus the shutter will open only if all cards are arranged in the correct order.

Provision is made for completing the shutter release circuit for card subsets of different length. For this purpose, one of the coding parameters is indicative of the number of cards in the subset. An additional set of contacts in the housing cooperates to inhibit release of the shutter and to actuate a fault buzzer if an attempt is made to release the shutter when fewer than the requisite number of cards have been inserted.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 1 is a perspective view of the inventive educational game with the shutters open to expose a picture formed by a subset of cards inserted in the correct sequence.

FIG. 2 is a diagram showing the coding of a typical set of game cards.

FIG. 3 is a front view of a typical coded, picture-forming card used with the game of FIG. 1.

FIG. 4 is a front view of a typical key card used with the game of FIG. 1.

FIG. 5 is a transverse sectional view of the game of FIG. 1, as seen generally along the line 5—5 thereof.

FIG. 6 is a sectional view of the game of FIG. 1, as seen generally along the line 6—6 of FIG. 5, and showing the electrical contact bars displaced by the key card.

FIG. 7 is a sectional view, as seen generally along the line 7—7 of FIG. 6, showing how contacts of a bar displaced by a key card project through holes in a correctly coded card to complete a shutter release circuit.

FIG. 8 is a fragmentary front view of the game also shown in FIG. 1, but with the shutters closed.

FIGS. 9, 10 and 11 are electrical schematic diagrams of circuitry useful with the present invention.

FIG. 12 is a transverse sectional view of one embodiment of a picture-forming card as shown in FIG. 3, as seen generally along the line 12—12 thereof.

FIG. 13 is a front view of an alternative embodiment of the invention, incorporating a window having sliding shutters.

DESCRIPTION OF PREFERRED EMBODIMENTS

The following detailed description is of the best presently contemplated modes of carrying out the invention. This description is not to be taken in a limiting sense but is made merely for the purpose of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Referring now to the drawings, a first embodiment 15 of the inventive educational game is shown in FIGS. 1 and 8. The game 15 includes a housing 16 having a window 17 provided with a pair of shutters 18 which normally are closed (FIG. 8) but which open (FIG. 1) when a correctly coded and sequenced subset of cards 19 is inserted to form a picture 20.

Initially a key card 21 (FIG. 4) is inserted into a receptacle 22 (FIG. 7) in the housing 16. The key card 21 specifies by indicia 23 a master code including as parameters a color 23a, a geometric shape 23b, and a numeral 23c which may indicate the number of letters in a word to be spelled. A question, fact or other information 24 also is printed on the key card 21. When inserted in the housing 16, the master code indicia 23 and the information 24 can be seen through a pair of windows 25, 26.

Each picture-forming card 19 (FIG. 3) includes a color designating region 30, a geometric shape 31, a letter 32 of the alphabet and a picture segment 33. To form the picture 20 (FIG. 1) the person playing the game 15 first must select from a set of variously coded cards only those cards 19 having a color 30 and a shape 31 corresponding respectively to the master code color 23a and shape 23b. The player then must insert the selected cards 19 into the respective slots 34a through 34e of the housing 15 so that the letters 32 correctly spell a word 35 which answers the question or is synonymous with the fact 24 printed on the master card 21.

As the cards 19 are inserted, the word 35 can be seen through a window 36 in the housing 15. After insertion of the number of cards 19 specified by the master card numeral 23c, a pushbutton 37 is depressed. If the word 35 is spelled correctly, the shutters 18 will open to expose the picture 20; if not, a buzzer 38 (FIGS. 9 and 10) will sound to indicate a fault.

For maximum interest, it is desirable to have many key cards 21 each with a different question and a different master code. To this end, FIG. 2 shows a coding matrix 40 for assignment of master codes. The color parameter 23a is selected from the five colors identifying the rows 41 and the shape parameter 23b is selected from those identifying the columns 42. For each block in the matrix 40 there may be a word of 3, 4 or 5 letters in length, corresponding to the master code numerical parameter 23c. In the example of FIG. 1, the master code includes the color BLUE (row 41a), the CIRCLE shape (column 42a) and is a five letter word ("PARIS") designated by the numeral 5 in the matrix block 40a. With this coding scheme, seventy-five different master codes or key cards 21 are available. Of course, by using a larger assortment of shapes, colors or numerals (and slots in the housing 15), a much greater number of master codes are possible.

Release of the shutters 18 is facilitated by an electrical circuit (FIGS. 9 and 10) incorporating a set of contact bars 43, 44, 45 (FIGS. 5, 6 and 7) slidingly mounted within the housing 15. The contact bars 43, 44, 45 are biased toward one end of the housing 15 by the respective springs 46, 47, 48 (FIG. 6) and are displaced into a coded arrangement by insertion of the key card 21 into the receptacle 22.

To accomplish such displacement, an edge 49 of the key card 21 has three sections 49a, 49b, 49c each having a length indicative of a corresponding master code 23 parameter. Thus the edge section 49a may have any of the five possible lengths designated 50a through 50e and corresponding respectively to the color values in the matrix rows 41 (FIG. 2). In the example of FIG. 4, the edge 49a has a length 50b indicative of the BLUE coding parameter 23a. The length of the edge sections 49b and 49c respectively specify the shape parameter 23b and the word length parameter 23c.

When the key card 21 is inserted in the receptacle 22, the edge sections 49a, 49b, 49c respectively displace the bars 43, 44, 45 into an arrangement corresponding to the master coding 23. A rear shoulder 51 engages an interior ledge 52 in the receptacle 22 to prevent the key card 21 from being ejected by the force of the bias springs 46, 47, 48. This maintains the bars 43, 44, 45 in the displaced, coded arrangement. A spring 53 retains the key card 21 in place.

The typical contact bar 45 includes five equally spaced, ball shaped electrical contacts 54a – 54e each situated within a respective hole 55a – 55e and provided with a respective bias spring 56a – 56e. The bars 43, 44 are provided with similar electrical contacts 57a – 57e and 58a – 58e. Alternate pairs of the contacts 54, 57 and 58 are electrically connected by conductive elements 59, 60, 61 within the bars 43, 44, 45. Associated with each contact bar 43, 44, 45 is a respective segmented electrical circuit board 63, 64, 65 mounted within the housing 16 across the slots 34a – 34e from the bars 43, 44, 45. The contact sets 54, 57, 58 and the boards 63, 64, 65 are electrically interconnected as shown in FIG. 9.

Each picture-forming card 19 (FIG. 3) includes near its lower end a set of three holes 66, 67, 68 arranged to designate the coding of that card. Thus the hole 66 is indicative of the color parameter 30, and may be positioned in any of the five locations designated 69a – 69e. In the example, the hole 66 is at the position 69b indicating the color blue. Similarly, the positions of the holes 67 and 68 indicate the shape and numerical parameters of the card 19.

In a card 19 having the same code as the master card 21, the holes 66, 67, 68 will have an arrangement corresponding to the key card edge segments 49a, 49b, 49c. When such a card 19 is inserted in the slot 34a, the holes 66, 67, 68 will register with the corresponding contacts 57a, 58a, 54a as shown in FIGS. 5 and 7. Accordingly, the contacts 57a, 58a, 54a will project through the card holes 66, 67, 68 into electrical contact with respective circuit board segments 63a, 64a, 65a. This will complete a series circuit, shown in FIG. 9, which will release the shutters 18 when the switch 37 is closed. If an incorrectly coded card 19 is inserted, at least one of the contacts 57a, 58a, 54a will not project through a hole in that card, and the resultant open circuit will prevent the shutters 18 from opening.

To insure that the cards 19 are inserted in the correct sequential order, the housing 15 also is provided with a stationary, sequence detecting contact bar 71 (FIGS. 5, 6 and 9) and an associated segmented circuit board 72. The bar 71 contains five spring-loaded ball contacts 73a – 73e each situated at a different location within the respective slot 34a – 34e.

Each picture-forming card 19 (FIG. 3) also contains a sequence hole 74 situated at one of five positions 75a – 75e spaced from the edge of the card by distances equal to the spacing between the code contact 73a – 73e and an edge of the respective slot 34a – 34e. The first card 19 in a particular coded subset may have the hole 74 at the position 75a, the second card at the position 75b, etc. When a correctly sequenced card is inserted, the hole 74 will register with the corresponding one of the contacts 73a – 73e. That contact will project through the hole 74 to connect with the circuit board 72, thereby enabling the shutters 18 to open. If a card 19 is inserted in the wrong sequential location, the hole 74 will not register with one of the contacts 73a – 73e and the resultant open circuit will prevent the shutters 18 from opening.

As shown in FIGS. 5 and 8, each shutter 18 is mounted by a hinge pin 76 and provided with a spring 77 which biases the shutter open. A solenoid actuated latch 78 mounted in the housing 15 maintains the shutters closed against the force of the spring 77.

As indicated by the circuit of FIG. 9, the shutter release solenoid 78a is series connected via the contact bars 43, 44, 45, 71 and the pushbutton switch 37 to a battery 79 and a current limiting resistor 80. When a correctly coded and sequenced subset of cards 19 is inserted and the switch 37 is depressed, current flows from the battery 79 through the switch 37, the closed contact sets 73, 57, 58 and 54 to the shutter release solenoid 78a. The solenoid latch 78 retracts and the shutters 18 open under the force of the bias spring 77.

If any inserted card 19 is incorrectly coded or sequenced, at least one of the contacts in the sets 54, 57, 58, 73 will not close, and the resultant open circuit will prevent actuation of the shutter release solenoid 78a. Instead, the fault buzzer 38 will sound. To accomplish this, a switch 81 (FIG. 5) includes a first switch section 81a which opens only when the shutters 18 open. The switch 37 is provided with two contacts which close in succession. THus, with an incorrectly coded card 19 present, depression of the pushbutton 37 first closes a circuit to the board 72. However, the circuit to the solenoid 78a remains open and the shutters 18 will not be released. Subsequently, the switch 37 will close a circuit to the closed switch section 81a to provide a current path from the battery 79 (FIG. 9) through the switch 37 and the switch section 81a to actuate the fault buzzer 38. Note that when the shutters 18 open to indicate a correct answer, the switch section 81a will open to inhibit the buzzer 38 from sounding.

To prevent the shutter release solenoid 78a from being energized if fewer than the requisite number of cards 19 are inserted, the game 15 may include yet another electrical contact bar 82 (FIGS. 6 and 9). This stationary bar 82 includes one contact 83a–83e for each slot 34a–34e. The contracts 83a–83e normally touch another segmented circuit board 84 (FIG. 9) to complete a parallel circuit from the board 65 to the fault buzzer 38.

As each card 19 is inserted in the housing 15, the lower end 85 of the card insulates the corresponding contact 83a–83e from the board 84. When all of the cards 19 are inserted, none of the contacts 83a–83e will touch the board 84, and the shutter release solenoid 78a can be actuated as described above. However, if fewer than the requisite number of cards 19 are inserted, at least one of the contacts 83a–83e will remain in circuit with the board 84, shunting the solenoid 78a. Accordingly, when the pushbutton 37 is depressed, current will bypass the solenoid 78a, the shutters 18 will remain closed, and the fault buzzer 38 will sound. In the embodiment shown, when using card sets of less than five letters per word, a blank card or cards (not shown) may be inserted in the slots 34d and 34e to open the respective contacts 83d and 83e.

The diagram of FIG. 10 summarizes the operation of the circuit of FIG. 9, and indicates that the shutter release solenoid 78a will be closed only when all of the cards No. 1 through No. 5 are inserted in the proper order, and when all of the contacts 83a – 83e are open circuited to prevent sounding of the fault buzzer 38.

A particularly attractive embodiment of the game 15 utilizes cards 19 wherein the picture-forming segment 33 is obscured until trans-illuminated from a lamp 86 (FIG. 5) situated in a chamber 87 within the housing 15 behind the window 17. Using the circuit of FIG. 11, the lamp 86 is turned on by a shutter switch section 81b which normally is open, but which closes to turn on the lamp 86 when the shutter 18 open.

The card 19' may include a picture segment 33 printed on a central laminate 87 (FIG. 12) covered by outer laminates 88 and 89. The materials of the layers 88 and 89 are appropriately chosen so that the picture on the layer 87 cannot be seen except when the card 19' is back lighted as by the lamp 86 behind the window 17. With this arrangement, the person playing the came cannot match the picture segments 33 in jigsaw puzzle fashion prior to inserting the cards 19' in the housing 15; he is forced to select the proper coding shape and color and to spell the word correctly. When the shutters 18 open, the picture 20 is a pleasant surprise.

Another embodiment of the invention is shown in FIG. 13, wherein a game 15' utilizes a housing 16' having sufficient slots so as to receive seven cards 19. Moreover, the window 17' is provided with a pair of sliding shutters 18'a and 18'b. The right shutter 18'b may be moved to a location defining the number of letters in the word to be formed. For example, in FIG. 13, the shutter 18'b is located between the third and fourth slots 34'c and 34'd; a three letter word is to be formed. The location of this shutter 18'b can condition the circuitry so that blank cards do not have to be inserted in the slots 34'd – 34'g. Further, the left shutter 18'a is adapted to slide to the left to expose the window 17' when the shutter release mechanism is actuated by insertion of the correct subset of the cards 19.

Intending to claim all novel, useful and unobvious features shown or described, the applicant claims:

1. An educational game using coded card strips each containing a design segment, a like coded subset of said card strips being insertable into a housing to form a graphic display obscured from view, the improvement comprising:
   a key card marked with a master code and receivable in said housing, and
   means conditioned by said received key card for exposing said graphic display to view only when a subset of said card strips coded like said master code are inserted in said housing in a correct sequence.

2. An educational game according to claim 1 further comprising:
   inhibit means for preventing exposure of said graphic display when less than a complete subset of said like coded card strips are inserted.

3. An educational game according to claim 1 wherein said means for exposing includes an electrical series circuit interrupted by insertion of an incorrectly coded or sequenced card strip.

4. An educational game according to claim 3 wherein said design is obscured by a shutter, release of said shutter being enabled by said uninterrupted electrical series circuit.

5. An educational game according to claim 1 wherein said means for exposing includes a set of code sensing members within said housing, said key card conditioning said members into an arrangement indicative of said master code, said members sensing the codes of said inserted card strips.

6. An educational game according to claim 5 wherein said members comprise electrical contact bars conditioned to establish a circuit only upon insertion of card strips coded like said master card.

7. An educational game according to claim 6 wherein said master key has an edge offset to define said master code, said offset edge displacing said bars into said master code indicative arrangement when said master key is received in said housing.

8. An educational game according to claim 7 wherein each of said card strips is coded by a set of holes through said card, said holes registering with the contacts of said displaced bars only when said inserted card strip is coded like said master code.

9. An educational game according to claim 6 further comprising sequence sensing contacts uniquely positioned in respective card strip receiving portions of said housing, each card strip further containing a sequence indicating element cooperating with said sequence sensing contacts to establish said circuit only when said card strips are inserted in correct sequence.

10. In an educational game of the type using cards each having a coded set of parameters, a correctly sequenced, like coded subset of said cards forming a unitary design, said cards being insertable into a housing to form said design behind a shuttered window, the improvement comprising:
  slidable contact bars in said housing,
  a key card adapted to displace said slidable contact bars to offset positions defining a master code,
  correctly sequenced, inserted cards coded like said master code registering with said displaced contact bars to complete a circuit enabling said shutter to open.

11. A game according to claim 10 wherein each bar includes a set of electrical contacts spring biased to project through a code indicating hole in said correctly sequenced and coded card to complete a portion of said circuit.

12. A game according to claim 11 wherein said bars are slidable perpendicular to said cards, and wherein an edge of said key card displaces said bars against respective bias springs.

13. A game according to claim 11 wherein said key card includes means for latched retention in said housing.

14. A game according to claim 11 wherein each card in a like coded subset includes a sequence indicating hole, and sequence detecting contacts in said housing, biased to project through said sequence indicating holes to complete said shutter circuit only when the cards are inserted in correct sequence.

15. A game according to claim 11 further comprising parallel circuit means opened by insertion of a card for inhibiting opening of said shutter when an imcomplete subset of cards have been inserted.

16. An educational game comprising:
  a housing having a shuttered window,
  a set of cards adapted for insertion into slots in said housing, each card being coded by a plurality of parameters,
  a subset of said cards having the same coding forming a picture behind the shutter of said window when inserted in correct sequence,
  a key card adapted for insertion into a receptacle in said housing and containing a master code thereon, and
  circuit means conditioned by said inserted key card for releasing said shutter only when a subset of cards coded in accordance with the key card master code is inserted into said slots in correct sequence.

17. A game according to claim 16 wherein the sequence of each card in a like coded subset is indicated by the location of a sequence hole through that card, there being a number of possible sequence hole locations corresponding respectively to available sequential positions of a card in said subset.

18. A game according to claim 17 wherein said housing comprises:
  a first segmented circuit board,
  a set of spring biased sequence sensing contacts each situated at the unique sequence hole location associated with a respective slot, insertion of a correctly sequenced card enabling the corresponding biased contact to project through the sequence indicating hole of that card into electrical circuit with said first board.

19. A game according to claim 16 wherein each card contains a row of possible hole locations for each parameter, and wherein said housing further comprises:
  a segmented circuit board for each parameter,
  a slidable, biased contact containing bar for each parameter,
  said key card being configured to displace laterally each bar by an amount indicative of the master code value of the corresponding parameter,
  so that upon insertion of a card having a master card corresponding parameter value, the parameter hole will register with a contact on said laterally displaced bar, enabling that contact to project through the card into circuit with the corresponding board section.

20. A game according to claim 19 wherein said contacts and circuit boards are included in a series circuit including a shutter release solenoid, application of voltage to said circuit energizing said solenoid to release said shutter except if said circuit is interrupted by insertion of an incorrectly coded or sequenced card.

21. A game according to claim 20 further comprising a fault buzzer and circuit means for sounding said buzzer when said voltage is applied if an incorrect or incomplete subset of cards has been inserted in said slots.

* * * * *